United States Patent [19]

Green et al.

[11] 3,862,823

[45] Jan. 28, 1975

[54] PROCESS AND COMPOSITION FOR CLEANING FIBROUS MATERIAL

[75] Inventors: Harold A. Green, Havertown, Pa.; Burton M. Like, East Brunswick, N.J.

[73] Assignee: Millmaster Onyx Corporation, New York, N.Y.

[22] Filed: Mar. 22, 1973

[21] Appl. No.: 343,680

[52] U.S. Cl............... 8/137, 252/545, 252/546
[51] Int. Cl............................................ D06l 1/12
[58] Field of Search......................... 8/137; 252/545

[56] References Cited
UNITED STATES PATENTS
3,401,007   9/1968   Hoffman et al.................... 8/137

*Primary Examiner*—Donald Levy
*Attorney, Agent, or Firm*—Arthur A. Jacobs, Esq.

[57] ABSTRACT

A process of cleaning fibrous materials such as carpets and the like by applying an aqueous composition which forms a foam on the material and then dries to a powder which can be brushed off or vacuumed away. The aqueous composition is an aqueous dilution of a mixture consisting essentially of (a) an alkali sulfate derived from an ethoxylated or polyethoxylated alcohol, (b) an alkali salt of a sulfosuccinic acid half ester, and (c) water. Of the solids content the ethoxysulfate salt comprises about 20 to 50 percent by weight and the sulfosuccinate salt about 50 to 80 percent by weight. Up to about half of the content of the ethoxysulfate salt may be replaced by an equivalent amount of alkali lauryl sulfate.

6 Claims, No Drawings

PROCESS AND COMPOSITION FOR CLEANING FIBROUS MATERIAL

This invention relates to a process and composition for cleaning fibrous materials such as carpets and the like, made of either material or synthetic fibers, and it particularly relates to a process utilizing an aqueous foam-forming composition which entrains dirt and soil from the material and then dries to a powdery substance which is removed by brushing, vacuuming or by similar removal means.

The foam which is formed in situ on the fibrous material must be sufficiently stable and long lasting to give the dirt and soil time to be loosened from the material and entrained in the foam. However, such stability and long lasting is deleteriously affected by the contaminants in "hard" water. These contaminants include calcium, magnesium, iron and other elements of similar nature, and the term "hard water" implies a content of at least about 75 ppm of such contaminants in the water.

In accordance with the present invention, there is provided a foam-forming cleaning composition which is highly satisfactory even in "very hard" water, i.e. where there are about 750 to 1,000 ppm of contaminants in the water.

The present composition is essentially a mixture of:

a. an alkali sulfate, preferably a sodium sulfate, derived from ethoxylated or polyethoxylated alcohol having the formula:

$$R-(O-C_2H_4)_n-OSO_3M$$

wherein R is an alkyl group of 12 to 16 carbon atoms, M is a salt-forming cation selected from the group consisting of sodium or potassium cations, but preferably sodium, and $n$ is an integer from 1 to 4, and b. an alkali salt, preferably the sodium salt, of a sulfosuccinic acid half-ester which conforms to the formula:

$$R-\overset{O}{\underset{\|}{C}}-NH-CH_2-CH_2-O-\overset{O}{\underset{\|}{C}}-\underset{\underset{X}{|}}{CH}-\underset{\underset{Y}{|}}{CH}-\overset{O}{\underset{\|}{C}}-OM$$

wherein R is an alkyl group of 11 to 15 carbon atoms, M is a salt-forming cation selected from the group consisting of sodium or potassium cations, but preferably sodium, and X and Y are either —H or —SO$_3$M, but where X and Y are different from each other.

The composition, before dilution, comprises about 75% by weight water and about 25% by weight solids. Of these solids, the ethoxysulfate salt may comprise about 20 to 50% by weight and the sulfosuccinate salt may comprise about 50 to 80% by weight.

If desired, up to about half the content of the ethoxysulfate salt may be replaced by an equivalent amount of an alkali lauryl sulfate, preferably sodium lauryl sulfate.

In addition to the above, it may also sometimes be desirable to add one or more other ingredients for different purposes, such as chelating agents, emulsifiers, thickeners, stabilizers, etc. Such additions are generally added in amounts which are deducted from the amount of water in the composition.

The following examples are illustrative of compositions embodying the present invention:

Example 1

| Components | % by weight |
|---|---|
| Sodium salt of the sulfosuccinic half ester of lauric acid monoethanolamide (40% active) | 40.0 |
| Sodium lauryl monoethylether sulfate (25% active) | 36.0 |
| Water (distilled) | 24.0 |

The above components are mixed together at ambient temperature and pressure to form the composition. Preferably, the water is hot (about 95°C) in order to expedite the formation of the solution.

Example 2

| Components | % by Weight |
|---|---|
| Sodium salt of the sulfosuccinic half ester of lauric acid monoethanolamide (40% active) | 40.0 |
| Sodium myristyl monoethyl sulfate (25% active) | 36.0 |
| "Super Amide L-9" (lauric acid diethanolamine condensate - 90% active) | 3.5 |
| Water (distilled) | 20.5 |

The components are mixed together as in Example 1 to form an aqueous solution wherein the "Super Amide" (Onyx Chemical Co.) acts to increase the viscosity of the composition and also even further increases the foam stability.

Example 3

| Components | % by Weight |
|---|---|
| Sodium salt of the sulfosuccinic half ester of lauric acid monoethanolamide (40% active) | 40.0 |
| Sodium lauryl triethylether sulfate (25% active) | 36.0 |
| Water (distilled) | 24.0 |

The mixture is made as in Example 1.

Example 4

| Components | % by Weight |
|---|---|
| Sodium salt of the sulfosuccinic half ester of lauric acid monoethanolamide (40% active) | 40.0 |
| Sodium lauryl monoethylether sulfate (25% active) | 18.0 |
| Sodium lauryl sulfate | 15.0 |
| Water (distilled) | 27.0 |

The components are mixed as in Example 1.

Each of the above compositions as well as other compositions within the scope of this invention may be most effectively used as a carpet shampoo by applying the composition in a dilution in tap water of, preferably, between 1:40 and about 1:100 of the composition relative to the water. The aqueous composition is then brushed vigorously to produce a foam. The foam is then permitted to dry to a powder, after which it is brushed or swept away, or vacuum cleaned, or otherwise removed from the carpet. It may be used in the same manner with regard to other fibrous materials, either natural or synthetic.

The invention claimed is:

1. A process for treating fibrous materials which comprises applying a wet composition capable of foaming and drying to a powdery substance to the fibrous material, producing a foam from said composition, permitting the foam to dry to a powdery substance, and then removing the powdery substance plus any entrained dirt and soil from the fibrous material, said composition being an aqueous solution containing a solids content comprising a mixture of (a) an ethoxysulfate salt having the formula:

$$R-(OCH_2H_4)_n-OSO_3M$$

wherein R is an alkyl group of 12 to 16 carbon atoms, M is a salt-forming cation selected from the group consisting of sodium and potassium cations, and $n$ is an integer from 1 to 4, and (b) a salt of a sulfosuccinic acid half-ester having the formula:

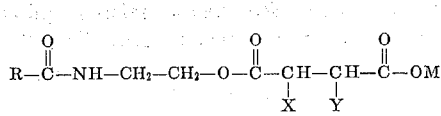

wherein R is an alkyl group of 11 to 15 carbon atoms, M is a salt-forming cation selected from the group consisting of sodium and potassium cations, and X and Y are either —H or —$SO_3M$, X and Y being different from each other, the ethoxysulfate salt comprising about 20 to 50% by weight of the solids content and the sulfosuccinate salt comprising about 50 to 80% of the solids content.

2. The process of claim 1 wherein between 0 to about 50% by weight of the ethoxysulfate salt is replaced by an equivalent amount of an alkali lauryl sulfate.

3. The process of claim 1 wherein said solids content comprises about 25% by weight of the composition.

4. The process of claim 1 wherein said solids content comprises about 25% by weight of the composition, and wherein a portion of the water content is replaced by a member selected from the group consisting of chelating agents, emulsifying agents, thickening agents, stabilizing agents, and selected mixtures thereof, said agents being present in amounts effective for their respective purposes.

5. The process of claim 1 wherein M is sodium.

6. The process of claim 2 wherein the alkali lauryl sulfate is sodium lauryl sulfate.

* * * * *